(12) United States Patent
Kano et al.

(10) Patent No.: US 6,393,336 B1
(45) Date of Patent: May 21, 2002

(54) NOZZLE CLOGGING DETECTION DEVICE AND METHOD

(75) Inventors: Yoshinori Kano; Takahiro Nagata; Ikuo Takemura, all of Gunma-ken (JP)

(73) Assignee: Sanyo Electric Co., Ltd., Osaka-Fu (JP)

( * ) Notice: Subject to any disclaimer, the term of this patent is extended or adjusted under 35 U.S.C. 154(b) by 0 days.

(21) Appl. No.: 09/510,632

(22) Filed: Feb. 22, 2000

(30) Foreign Application Priority Data

Feb. 23, 1999 (JP) .......................................... 11-045357

(51) Int. Cl.[7] .......................... G06F 7/00; G05D 16/00; G01L 27/00
(52) U.S. Cl. ...................... 700/228; 700/301; 73/1.58
(58) Field of Search ................................. 700/228, 301; 73/1.58

(56) References Cited

U.S. PATENT DOCUMENTS

| | | | |
|---|---|---|---|
| 4,668,948 A | * | 5/1987 | Merkel ....................... 221/1 X |
| 5,117,675 A | * | 6/1992 | Notoyama et al. ............. 73/37 |
| 5,285,673 A | * | 2/1994 | Drexel et al. .................... 73/3 |
| 5,481,482 A | * | 1/1996 | Nagai et al. .................. 73/4 V |
| 5,525,023 A | * | 6/1996 | Soga et al. ............. 198/396 X |
| 5,617,338 A | * | 4/1997 | Sugano et al. .......... 700/301 X |
| 5,865,764 A | * | 2/1999 | Moorhead ............... 600/561 X |
| 5,980,034 A | * | 11/1999 | Tsai et al. ................. 347/89 X |

FOREIGN PATENT DOCUMENTS

JP 6209189 7/1994 .......... H05K/13/04

* cited by examiner

*Primary Examiner*—Christopher P. Ellis
*Assistant Examiner*—Gene O. Crawford
(74) *Attorney, Agent, or Firm*—Darby & Darby

(57) ABSTRACT

There are provided a nozzle clogging detection device for an electronic component-mounting apparatus, which has a simple construction and is capable of accurately detecting clogging of a vacuum nozzle and erroneous mounting of a vacuum nozzle different in diameter, and a nozzle clogging detection method therefor. A flow meter is arranged across a vacuum passage communicating between a vacuum pump and the nozzle hole of the vacuum nozzle, for measuring an actual flow rate of air drawn in through the nozzle hole. Clogging of the nozzle hole and erroneous mounting of the vacuum nozzle is detected by comparing the actual flow rate measured by the flow meter with a design flow rate of air to be drawn through the nozzle hole, the design flow rate of air being stored in advance.

6 Claims, 8 Drawing Sheets

F I G. 1
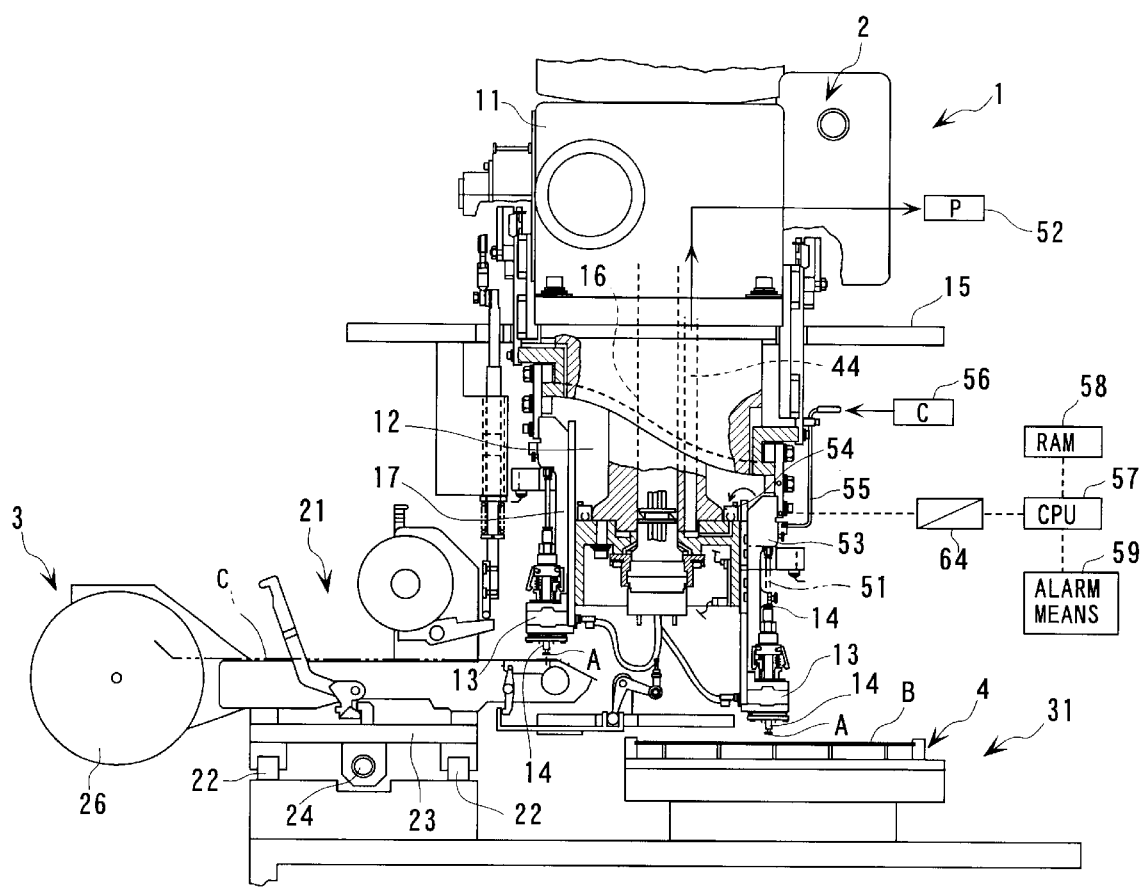

NOZZLE CLOGGING DETECTION DEVICE AND METHOD

BACKGROUND OF THE INVENTION

1. Field of the Invention

This invention relates to a nozzle clogging detection device and method f or detecting clogging of a vacuum nozzle and erroneous mounting of the vacuum nozzle in an electronic component-mounting apparatus.

2. Prior Art

A vacuum nozzle for sucking or picking up by vacuum electronic components occasionally sucks in very small cut-off pieces of a carrier tape and solder paste from a circuit board when it picks up electronic components. The cut-off pieces and the solder paste sometimes adhere to and deposit on the inner surface of the nozzle hole of the vacuum nozzle to eventually clog the same. Further, a vacuum nozzle not corresponding to electronic components to be picked up is sometimes erroneously mounted on a mounting head of the electronic component-mounting apparatus. Such clogging of a vacuum nozzle and erroneous mounting of the same cause failure of suction or faulty mounting of electronic components.

Conventionally, in the nozzle clogging detection method of the above-mentioned kind, a pressure sensor is arranged across a vacuum passage communicating between a vacuum nozzle and vacuum suction means, and an actual pressure value detected by the pressure sensor is compared with a design pressure value thereof, whereby clogging of the vacuum nozzle or erroneous mounting of a vacuum nozzle different in diameter is detected. Further, a nozzle clogging detection method has been proposed e.g. by Japanese Laid-Open Patent Publication (Kokai) No. 6-209189, which takes an image of a nozzle hole by using a camera to detect clogging of the same.

In such a conventional method based on detection of pressures, when a vacuum nozzle with a small diameter is employed, the difference between the actual pressure value and the design pressure value of a clogged vacuum nozzle is very small, which often results in erroneous detection of the clogging. Further, the method of taking an image of a nozzle hole suffers from the problem that it is required to use not only a nozzle exclusively provided therefor in a manner adapted to the use of the camera such that a nozzle hole extends through the nozzle along the vertical axis thereof, but also lighting means for illuminating the inside of the nozzle to permit an image of the hole to be taken, in addition to a camera. This complicates the configuration of the nozzle clogging detector device to which the method is applied.

SUMMARY OF THE INVENTION

It is a first object of the invention to provide a nozzle clogging detection device that has a simple construction and is capable of accurately detecting clogging of a vacuum nozzle and erroneous mounting of a vacuum nozzle different in diameter.

It is a second object of the invention to provide a method that is capable or accurately detecting clogging of a vacuum nozzle and erroneous mounting of a vacuum nozzle different in diameter.

To attain the first object, according to a first aspect of the invention, there is provided a nozzle clogging detection device for an electronic component-mounting apparatus including a vacuum nozzle for picking up an electronic component by vacuum, the vacuum nozzle having a nozzle hole, vacuum means for drawing air via the nozzle hole of the vacuum nozzle, and a vacuum passage communicating between the vacuum means and the nozzle hole of the vacuum nozzle, the nozzle clogging detection device detecting clogging of the nozzle hole of the vacuum nozzle and erroneous mounting of the vacuum nozzle.

The nozzle clogging detection device according to the first aspect of the invention is characterized by comprising:

flow rate measurement means arranged across the vacuum passage for measuring an actual flow rate of air drawn in through the nozzle hole; and nozzle clogging detection means for detecting clogging of the nozzle hole and erroneous mounting of the vacuum nozzle, by comparing the actual flow rate measured by the flow rate measurement means with a design flow rate of air to be drawn through the nozzle hole, the design flow rate of air being stored in advance.

According to this nozzle clogging detection device, attention is paid to the fact that when the suction pressure of the vacuum means is approximately constant, the flow rate of drawn air passing through a passage having a certain cross-sectional area is in direct proportion to the cross-sectional area of the passage. Hence, the flow rate of air drawn in through the nozzle hole is measured by the flow rate measurement means, and the result of the measurement is compared with the design flow rate of air to be drawn in through the nozzle hole of the vacuum nozzle, which was measured by using a new vacuum nozzle of an identical type and stored in advance. This makes it possible to detect the degree of clogging of the vacuum nozzle of which the flow rate of drawn air is actually measured. The flow rate measurement means may be integrated into the vacuum passage, and further, there is no need to use vacuum nozzles specially configured.

Preferably, the clogging detection device includes a vacuum valve arranged across the vacuum passage for switching between the vacuum passage communicating with the vacuum means and a nozzle hole-opening passage for opening the nozzle hole to an atmosphere, and the flow rate measurement means is arranged across a portion of the vacuum passage located between the vacuum valve and the vacuum means.

According to this preferred embodiment, when an electronic component is mounted on a circuit board, the vacuum valve is switched to connect to the nozzle hole-opening passage, whereupon a large amount of air flows into a vacuum nozzle-side portion of the vacuum passage. This makes it undesirable to install in this passage portion the flow rate measurement means which is required to measure a very small flow rate of air, since installation of the flow rate measurement means in such a place results in a faulty operation of the same. In contrast, in a portion of the vacuum passage between the vacuum valve and the vacuum means, only drawn air is allowed to flow in and hence prevent a large amount of air from flowing in. This ensures stable operation of the flow rate measurement means, thereby making it possible to measure the flow rate of air with high accuracy.

Preferably, the flow rate measurement means comprises a flow meter that includes a planar member arranged along a direction of flow of air drawn in, the planar member having an upstream-side portion and a down-stream side potion, and measures the flow rate of air based on a difference between a temperature of the upstream-side portion of the planar member and a temperature of the downstream-side portion of the planar member.

According to this preferred embodiment, it is possible to accurately measure a very small flow rate of drawn air. More particularly, it is possible to detect clogging of a vacuum nozzle having a small diameter with accuracy.

Preferably, the nozzle clogging detection means includes calculation means for calculating a difference between the actual flow rate measured by the flow rate measurement means and the design flow rate, and judgment means for judging that there occurs the clogging of the nozzle hole or the erroneous mounting of the vacuum nozzle when the absolute value of the difference is larger than a predetermined value.

Preferably, the nozzle clogging detection device includes notification means for carrying out notification of occurrence of the clogging of the nozzle hole or the erroneous mounting of the vacuum nozzle, when the nozzle clogging detection means detects the clogging of the nozzle hole or the erroneous mounting of the vacuum nozzle.

To attain the second object, according to a second aspect of the invention, there is provided a method of detecting clogging of a nozzle hole of a vacuum nozzle mounted in an electronic component-mounting apparatus for picking up an electronic component by vacuum, and erroneous mounting of the vacuum nozzle.

The method according to the second aspect of the invention is characterized by comprising the steps of:

measuring an actual flow rate of air drawn in through the nozzle hole of the vacuum nozzle; and detecting clogging of the nozzle hole and erroneous mounting of the vacuum nozzle, by comparing the actual flow rate with a design flow rate of air to be drawn through the nozzle hole of the vacuum nozzle with each other.

According to this method, the flow rate of air drawn in through the nozzle hole is measured, and the result of the measurement is compared with the design flow rate of air to be drawn in through the nozzle hole of the same vacuum nozzle, which was measured by using a new vacuum nozzle of an identical type and stored in advance, whereby it is possible to accurately and easily detect the degree of clogging of the vacuum nozzle of which the flow rate of drawn air is actually measured.

The above and other objects, features, and advantages of the invention will become more apparent from the following detailed description taken in conjunction with the accompanying drawings.

BRIEF DESCRIPTION OF THE DRAWINGS

FIG. 1 is a side view of an electronic component-mounting apparatus incorporating a nozzle clogging detection device according to an embodiment of the invention;

DETAILED DESCRIPTION

Figure 2:
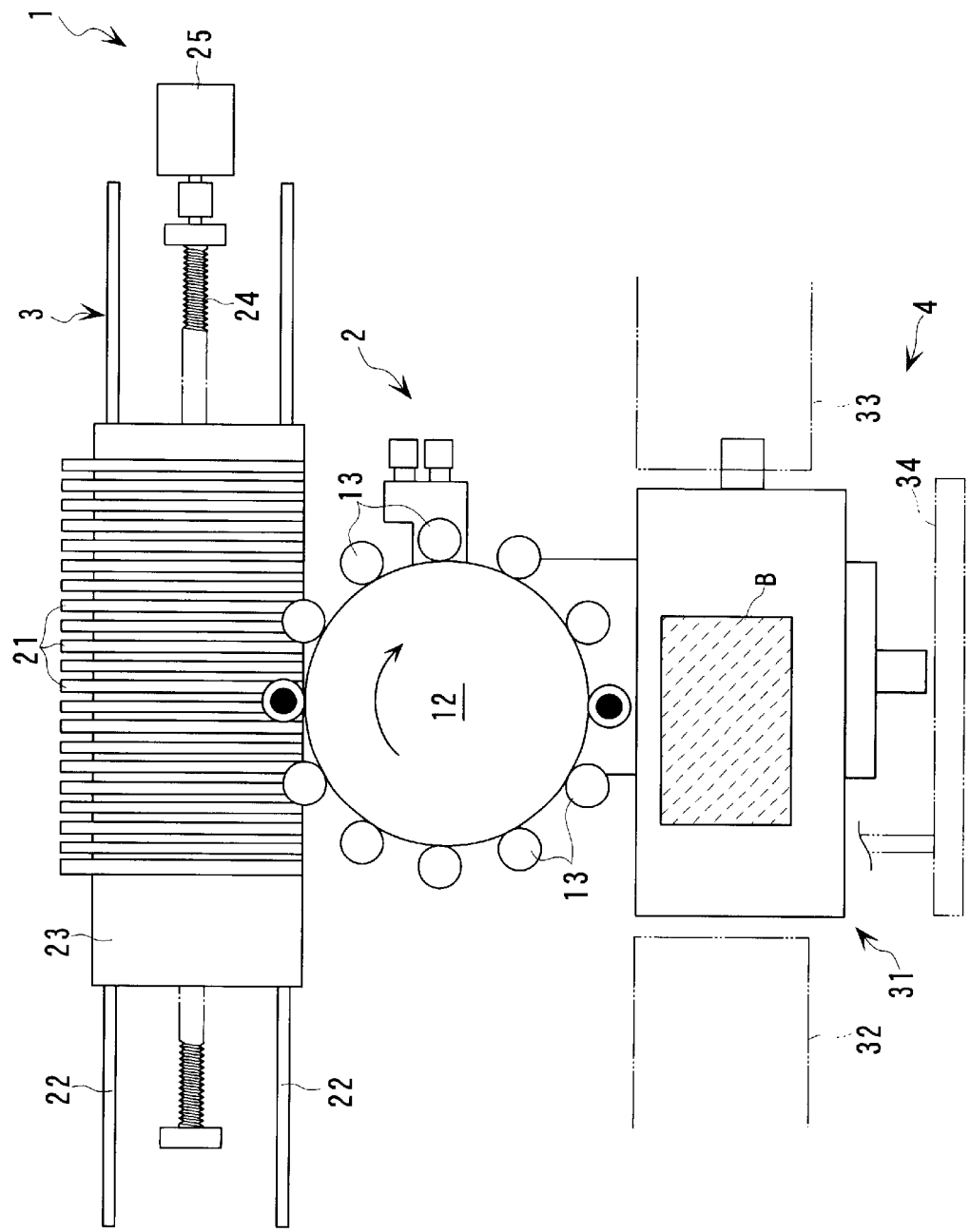
FIG. 2 is a plan view of the electronic component-mounting apparatus.

The invention will now be described in detail with reference to the drawings showing an embodiment thereof. In the embodiment, a nozzle clogging detection device and method according to the invention are applied to an electronic component-mounting apparatus. FIG. 1 is a side view of the electronic component-mounting apparatus, and FIG. 2 is a plan view of the same. As shown in these figures, the electronic component-mounting apparatus 1 includes a main unit 2, a feeding section 3 for feeding electronic components A, and a mounting section 4 for mounting the electronic components A on a circuit board B, with the feeding section 3 and the mounting section 4 being arranged on opposite sides of the main unit 2 in a manner parallel to each other.

The main unit 2 is comprised of an index unit 11 which forms a main part of the driving system of the apparatus, a rotary table 12 coupled thereto, and a plurality of (twelve, in the present embodiment) mounting heads 13 arranged on the outer periphery of the rotary table 12. The rotary table 12 is intermittently rotated by the index unit 11 in angular increments corresponding to the number of the mounting heads 13. With intermittent rotation of the rotary table 12, a selected one of vacuum nozzles 14 carried by each mounting head 13 is properly brought to the feeding section 3 and the mounting section 4, whereby each selected vacuum nozzle 14 sucks or picks up by vacuum an electronic component A supplied at the feeding section 3, carries the same to the mounting section 4 through intermittent rotation of the rotary table 12, and mounts the same on the circuit board B supplied at the mounting section 4.

The feeding section 3 has tape cassettes 21 corresponding in number to the number of kinds of electronic components A to be mounted on the circuit board B. Such a large number of tape cassettes 21 are removably mounted on a feed table 23 in parallel with each other perpendicularly to the directions of forward/backward movements of the feed table 23. A pair of guide rails 22 and 22 slidably guides the feed table 23. A ball screw 24 extends through the feed table 23 in a direction of its sliding on the guide rails 22, whereby the feed table 23 is moved forward and backward by respective normal and reverse rotations of a feed motor 25 connected to one end of the ball screw 24, to selectively bring a selected one of the tape cassettes 21 to a suction station for the mounting heads 13. Each tape cassette 21 contains a roll of a carrier tape C which carries electronic components A thereon at intervals of a predetermined pitch and is wound around a tape reel 26, and the electronic components A are sequentially picked up by a corresponding one of the vacuum nozzles 14 by vacuum as the carrier tape C is unwound from the tape reel 26. After the electronic components A are picked up, the carrier tape C is cut off and disposed of as required.

The mounting section 4 is comprised of an X-Y table 31 for moving the circuit board B placed thereon in the directions of an X axis and a Y axis, a feed conveyor 32 and a delivery conveyor 33 arranged to face respective opposite longitudinal ends of the X-Y table 31, and a circuit board transfer device 34 for transferring a circuit board B on the feed conveyor 32 onto the X-Y table 31 and at the same time transferring a preceding circuit board B already placed on the X-Y table onto the delivery conveyor 33. That is, the circuit board B sent to a downstream end of the feed conveyor 32 is transferred by the circuit board transfer device 34 onto the X-Y table 31, and at the same time, the circuit board B having the electronic components A mounted thereon is transferred by the circuit board transfer device 34 onto the delivery conveyor 33. The circuit board B placed on the X-Y table 31 is moved to its predetermined positions on a horizontal plane by the X-Y table 31 such that specific portions thereof are sequentially brought to a mounting station for the mounting heads 13, at which each electronic component A held at a selected suction nozzle 14 of each mounting head 13 is mounted at its specific portion of the circuit board.

The index unit 11 of the main unit 2, which forms the main part of the whole driving system of the apparatus, is supported by a support table 15. The index unit 11 intermittently rotates the rotary table 12, and at the same time causes various devices mounted on the main unit 2 and the tape cassettes 21 to operate in a manner synchronous with a repetition period of intermittent rotation of the rotary table 12.

The rotary table 12 is rigidly mounted on a vertical shaft 16 extending perpendicularly downward from the index unit 11 and is driven for clockwise intermittent rotation as viewed in FIG. 2. The twelve mounting heads 13 arranged at circumferential intervals along the periphery of the rotary table 12 are vertically movably mounted on the periphery of the rotary table 12 via respective brackets 17. In the present embodiment, the rotary table 12 performs twelve intermittent rotations or index motions to make one complete rotational turn in a manner corresponding to the number of mounting heads 13. The mounting heads 13, which intermittently move about the rotational axis of the rotary table 12, are sequentially brought to twelve stations including the suction station in the feeding section, at which electronic components are picked up by vacuum by respective selected vacuum nozzles 14, and the mounting station in the mounting section, at which the picked electronic components are sequentially mounted on a circuit board as well as a station at which an image of the picked electronic component is taken and a position thereof is corrected if required, and another station at which nozzles are changed (switched).

Figure 3:
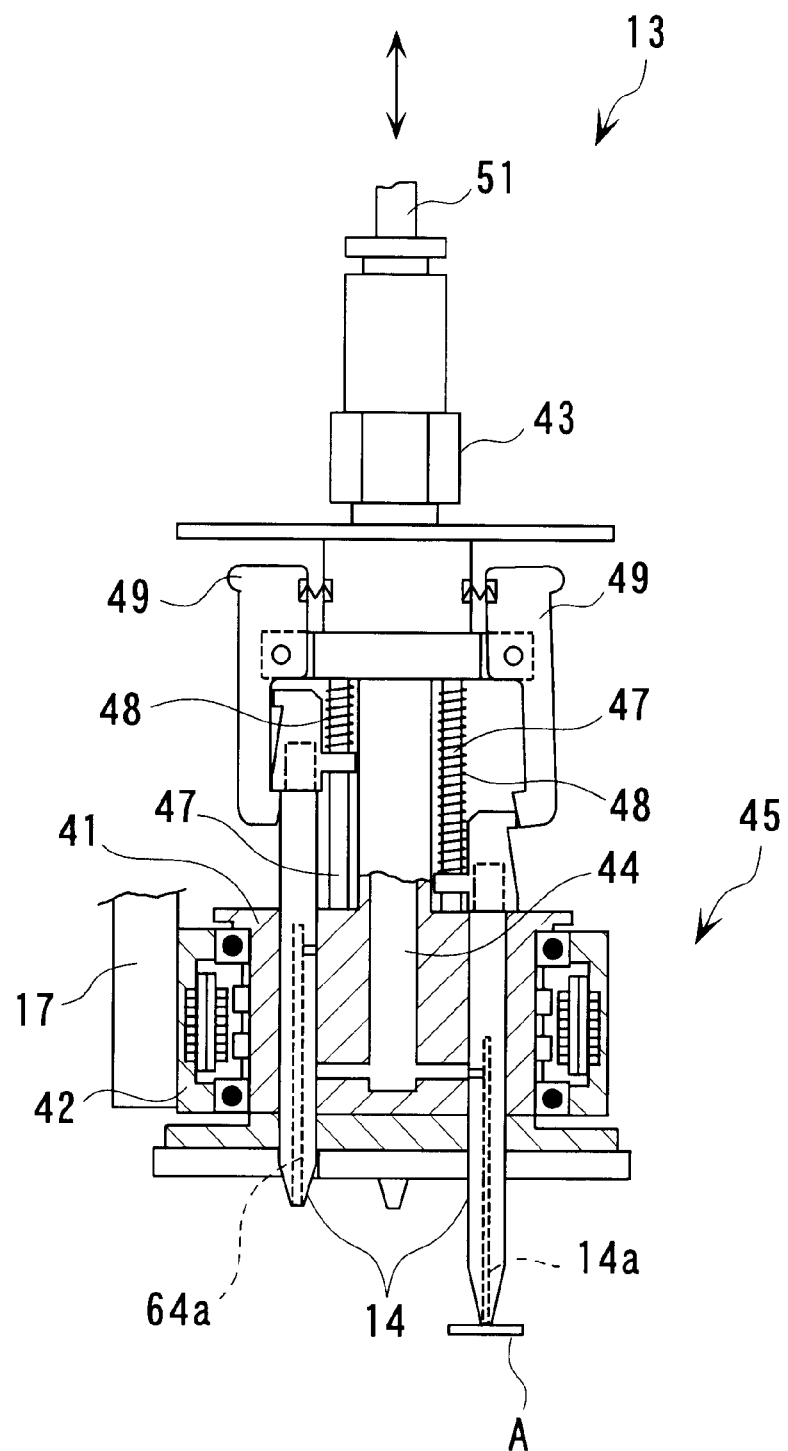
FIG. 3 is a side sectional view of a mounting head appearing in FIG. 1.

As shown in FIG. 3, each mounting head 13 includes a nozzle holder 41 having a plurality of (approximately five, in the present embodiment) vacuum nozzles 14 arranged at circumferentially equal intervals on the periphery thereof in a manner capable of projecting and retracting vertically, a holder support member 42 secured to the bracket 17 on the main unit 2 and rotatably supporting the nozzle holder 41, and a passage member 43 mounted vertically on an upper surface of the nozzle holder 41 and having a vacuum passage 44 formed through a central portion thereof along the vertical axis thereof. Arranged between the nozzle holder 41 and the holder support member 42 is a motor (stepping motor) 45 that incorporates the nozzle holder 41 as a rotor and the holder support member 42 as a stator. The motor 45 drives the nozzle holder 41 for rotation with respect to the holder support member 42, causing the vacuum nozzles 14 to move about the axis of the nozzle holder 41.

Each of the vacuum nozzles 14 has an upper portion engaged with a guide pin 47 of the nozzle holder 41 in a manner such that the vacuum nozzle is capable of sliding vertically and at the same time urged by a coil spring 48 wound around the guide pin 47 in a projecting direction. Arranged at an upper portion of the nozzle holder 41 are post members 49 corresponding to respective vacuum nozzles 14 for catching vacuum nozzles other than a projecting one. The projecting vacuum nozzle 14 is urged downward by the coil spring 48.

The lower portion of each vacuum nozzle 14 is formed with a nozzle hole 14a extending along the vertical axis of the vacuum nozzle 14. The upper end of the nozzle hole 14a communicates with the vacuum passage 44 of the nozzle holder 41 when the vacuum nozzle 14 is protruded from the lower end face of the nozzle holder 41. The vacuum passage 44 communicates with a vacuum pump 52 forming a vacuum source through the passage member 43 via a vacuum hose 51. That is, the vacuum passage 44 formed through the nozzle holder 41, the passage member 43 and the vacuum hose 51 permits the nozzle hole 14a at an upstream end thereof to be communicated with the vacuum pump 52 at a downstream end thereof. Further, the vacuum passage 44 has a vacuum valve 53 and a flow meter (flow rate measurement means) 54 arranged between the vacuum nozzle 14 (nozzle hole 14a) and the vacuum pump 52 (see FIGS. 1 and 4).

The vacuum valve 53 is provided for switching between the vacuum passage 44 communicating with the vacuum pump 52 and a nozzle hole-opening passage 55 for opening the nozzle hole 14a to the atmosphere. The nozzle hole-opening passage 55 communicates with a compressor 56 (see FIGS. 1 and 4). When the vacuum nozzle 14 picks up by vacuum an electronic component A, the vacuum valve 53 is switched to connect the vacuum passage 44 to the vacuum pump 52 to thereby draw air from the nozzle hole 14a of the vacuum nozzle 14, whereas when the electronic component A is mounted on the circuit board B, the vacuum valve 53 is switched to connect the vacuum passage 44 to the nozzle hole-opening passage 55 such that air is blown from the compressor 56 into the nozzle hole 14a after the nozzle hole 14a is opened to the atmosphere. This causes the electronic component A to be positively separated from the distal end of the vacuum nozzle 14 and thereby mounted on the circuit board B.

Figure 4:
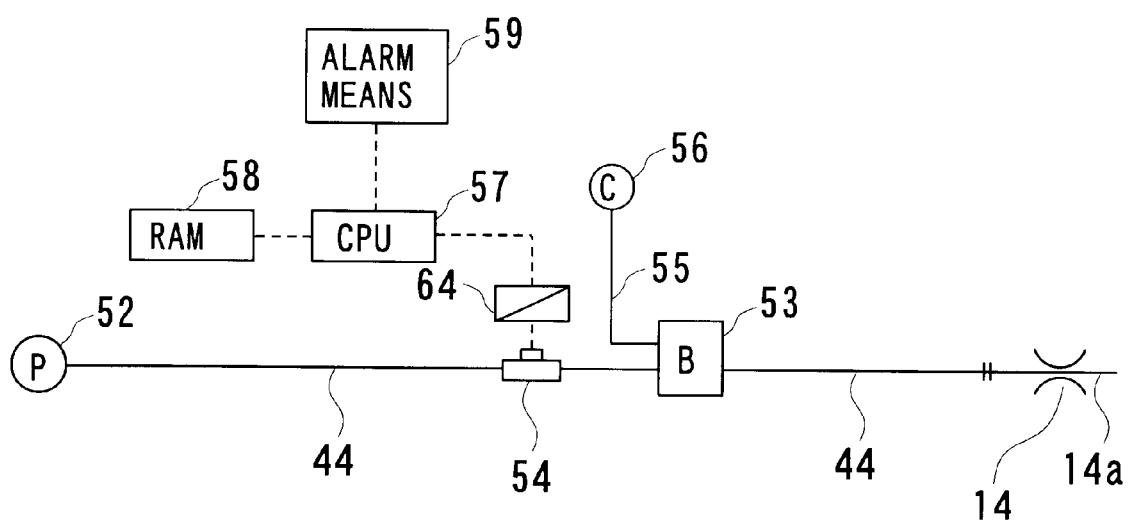
FIG. 4 is a block diagram showing a vacuum system comprised of a vacuum nozzle and component parts associated therewith, appearing in FIG. 1.
Figure 5C:
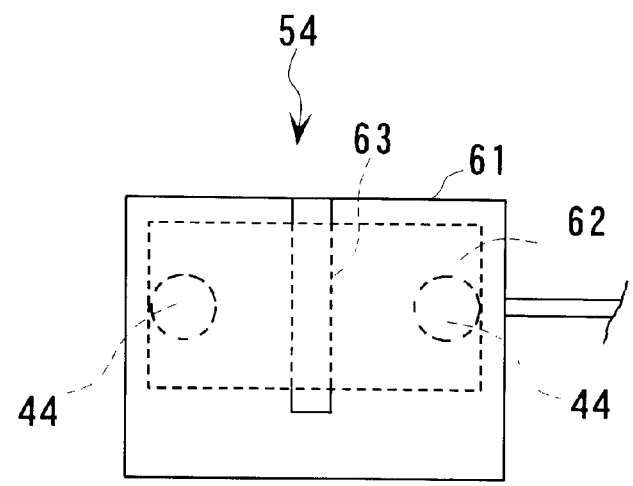
FIG. 5C is a plan view of the flow meter.
Figure 5A:
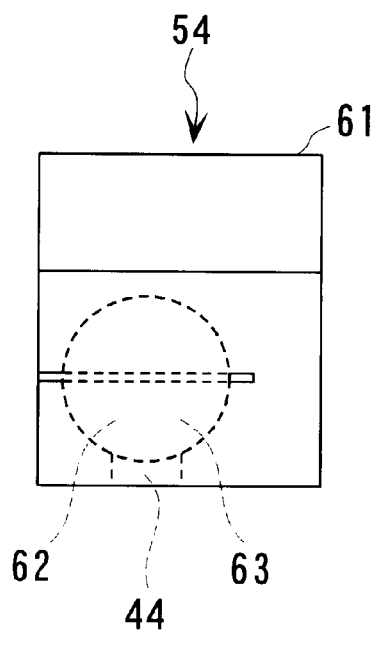
FIG. 5A is a side view of a flow meter appearing in FIG. 1.
Figure 5B:
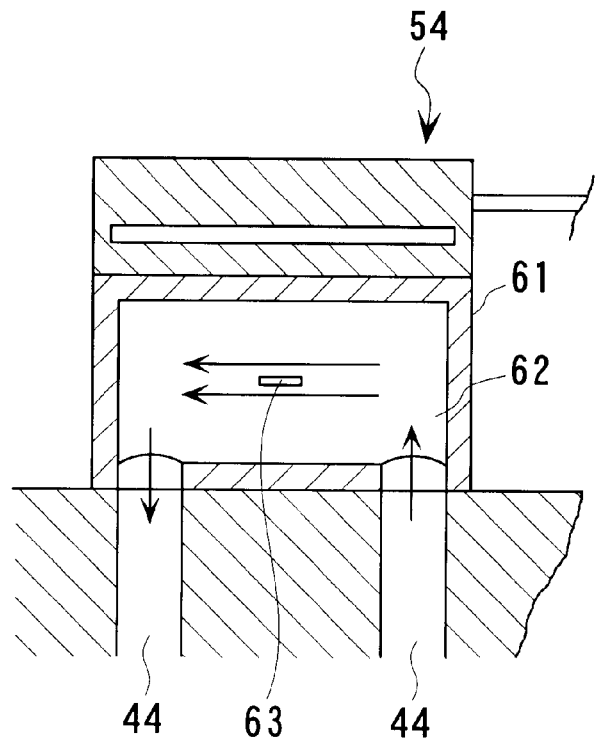
FIG. 5B is a cross-sectional view of the flow meter.

The flow meter 54 is arranged across the vacuum passage 44 between the vacuum pump 52 and the vacuum valve 53 (see FIG. 4). As shown in FIGS. 5A to 5C, the flow meter 54 has a passage space 62 formed in a housing 61 and having a cylindrical shape. The passage space 62 includes openings at respective upstream and downstream ends thereof communicating with the vacuum passage 44, and a flow sensor 63 arranged in the passage space 62. The flow sensor 63 is comprised of a semiconductor device extending in a direction transverse to the passage space 62. The flow sensor 63 is connected to a control block 64 that controls the flow meter 54. The flaw sensor 63 is in the form of a rectangular plate arranged such that drawn air flows along a shorter side thereof. A very small difference in temperature is generated between a upstream-side portion of the flow sensor 63 and a downstream side-portion of the same by the flow of the drawn air passing the flow sensor 63, and the flowrate of air is measured based on the difference in temperature. The results of the measurement are converted by the control block 64 to a digital signal which is delivered to a CPU (nozzle clogging detection means) 57.

Figure 6:
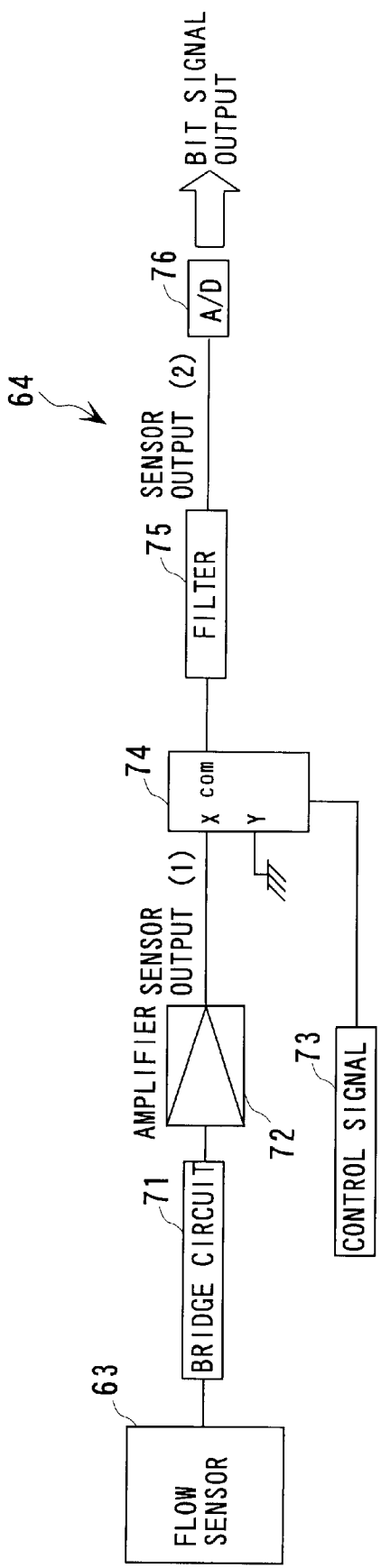
FIG. 6 is a block diagram showing a control block appearing in FIG. 1.
Figure 7:
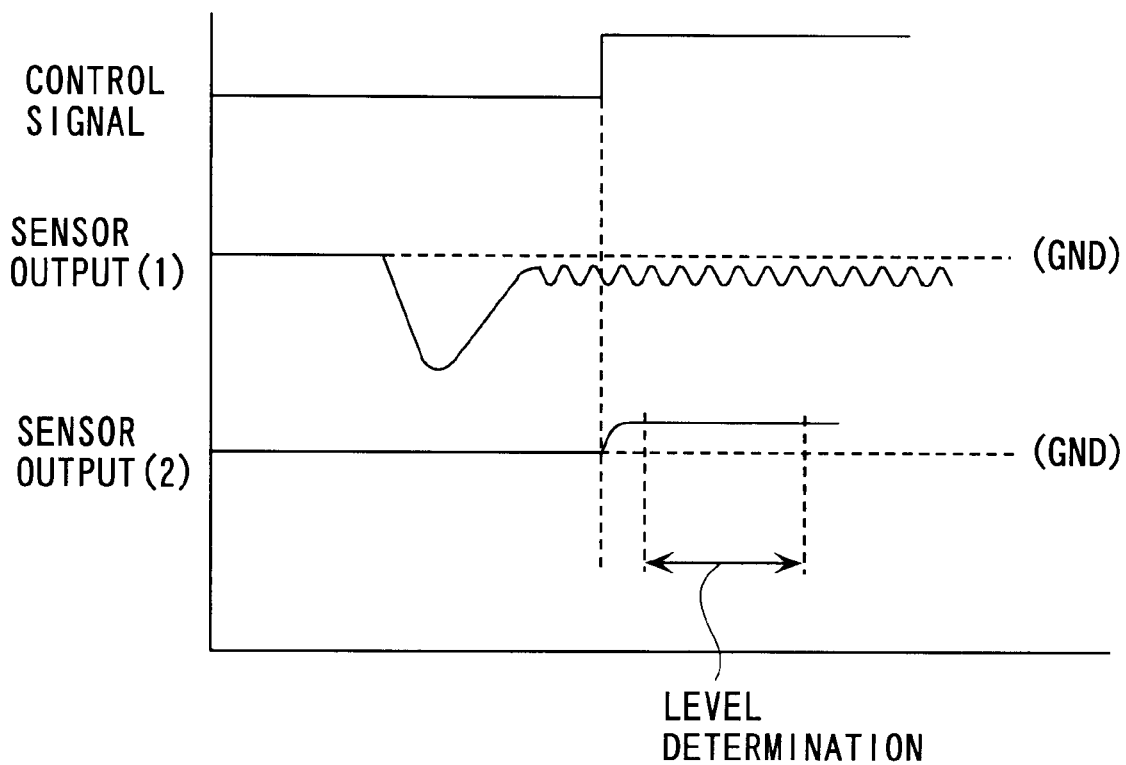
FIG. 7 is a timing chart showing changes in signals delivered from respective portions of the control block.

FIG. 6 is a block diagram showing the control block 64 of the flow meter 54. FIG. 7 is a timing chart showing changes in signals delivered from respective operating portions of the control block 64. Referring to the figures, the control block 64 extracts a voltage signal corresponding to the difference in temperature (that is, the flow rate of the drawn air) between the upstream-side portion and the downstream-side portion of the flow sensor 63 by using a bridge circuit 71 connected to the flow sensor 63. After the voltage signal is amplified by an amplifier 72 (to generate a sensor output signal (1)), the level of the amplified voltage signal is compared with GND level by a comparator 74, by using a predetermined control signal 73 as a trigger, to thereby extract the difference in an electric potential therebetween. Then, after correction of the electric potential difference is carried out in a predetermined manner by a filter 75 (to generate a sensor output signal (2)), the potential difference within a predetermined signal level-determining time period is converted by an A/D converter 76 to a signal e.g. of 4 bits showing the flow rate of the drawn air, for delivery.

The bit signal obtained by the A/D conversion is input to the CPU 57 for comparison with the design flow rate (bit signal) of drawn air, which the CPU 57 has read from nozzle data stored in a RAM 58. That is, the CPU 57 calculates the difference between the actual flow rate represented by the sensor output signal and the design flow rate (thus implementing calculation means). If the absolute value of the difference between the actual flow rate and the design flow rate is larger than a predetermined value, the CPU 57 determines that there occurs nozzle clogging or erroneous mounting of a vacuum nozzle (thus implementing judgment means), and causes alarm means 59 to generate a voice alarm and at the same time display a message on a display screen, for notifying the user of occurrence of the problems.

Figure 8:
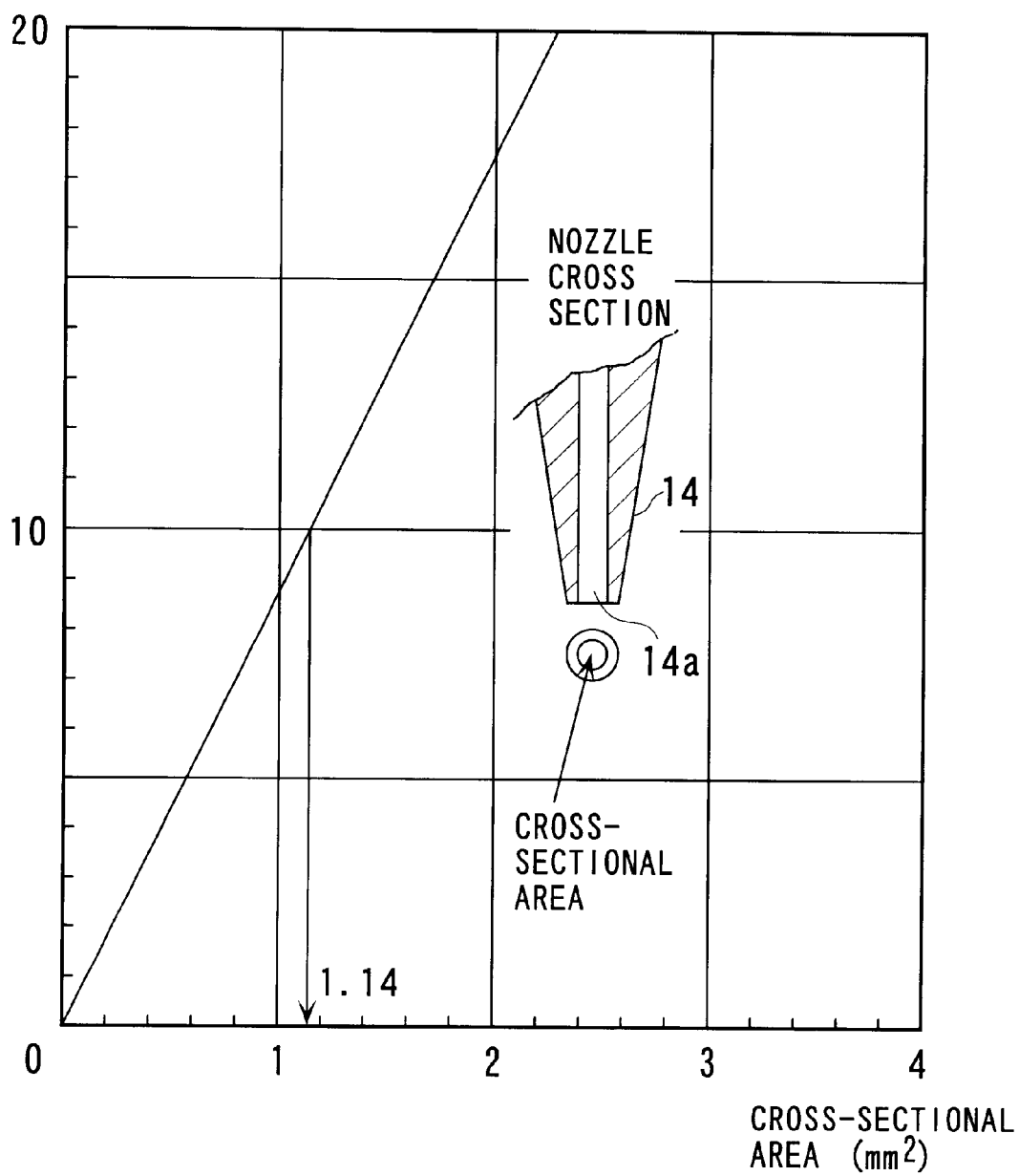
FIG. 8 is a diagrammatic view showing the relationship between the cross-sectional area of the nozzle hole of the vacuum nozzle and the flow rate of drawn air.

FIG. 8 shows the relationship between the cross-sectional area of the nozzle hole 14a of the vacuum nozzle 14 and the flow rate of drawn air. As shown in the figure, the design flow rate of drawn air is in direct proportion to the cross-sectional area of the nozzle hole 14a. For instance, if the nozzle hole 14a has a diameter of 0.6 mm (cross-sectional area thereof =1.14 mm$^2$), the design flow rate of drawn air is approximately equal to 10 liters/min. Further, if the nozzle hole 14a has a diameter of 0.4 mm (cross-sectional area thereof =0.4 mm$^2$), the design flow rate of drawn air is approximately equal to 3.5 liters/min. Therefore, the design flow rate of drawn air is compared with the actual flow rate while considering a tolerance of the design flow rate.

As described above, according to the present embodiment, nozzle clogging or erroneous mounting of a vacuum nozzle 14 is detected by the flow rate of air drawn in through the nozzle hole 14a of the vacuum nozzle 14, so that it is possible to accurately detect nozzle clogging or erroneous mounting operation. Especially, when the vacuum nozzle 14 has a nozzle hole 14a small in diameter, it is possible to effectively prevent an erroneous detection. Further, since the flow meter 54 is arranged across the vacuum passage 44 between the vacuum valve 53 and the vacuum pump 52 where a large amount of air does not flow, it is possible to ensure reliable measurement of the flow rate of air as well as minimize the possibility of failure of the flow meter 54 and the like. Furthermore, there is no need to measure the flow rate of drawn air at a specific stop position of each mounting head 13, which enables the detection itself to be carried out with ease.

It should be noted that a flow meter used is not limited to that of the above embodiment, but another type of a flow meter may be employed. Further, it goes without saying that the nozzle clogging detection device and method according to the invention can be applied to the vacuum or suction nozzles of a so-called multifunction mounter.

As described hereinabove, according to the nozzle clogging detection device and method of the invention, attention is paid to the fact that the cross-sectional area of the nozzle hole of a vacuum nozzle and the flow rate of air drawn in through the nozzle hole are in direct proportion to each other, and clogging of the vacuum nozzle and the erroneous mounting of a vacuum nozzle different in diameter from a proper one are detected based on the flow rate of the drawn air measured by the flow rate measurement means. This makes it possible to carry out the detection with accuracy. Therefore, it is possible to prevent or minimize the possibility of failure of suction or erroneous mounting of electronic components due to clogging of a vacuum nozzle or erroneous mounting of the vacuum nozzle.

Further, the flow rate measurement means may be integrated into the vacuum passage and there is no need to use vacuum nozzles having special configurations, so that the construction of the nozzle clogging detection device can be simplified as a whole.

It is further understood by those skilled in the art that the foregoing are preferred embodiments of the invention, and that various changes and modifications may be made without departing from the spirit and scope thereof.

What is claimed is:

1. A nozzle clogging detection device for an electronic component-mounting apparatus including a vacuum nozzle for picking up an electronic component by vacuum, said vacuum nozzle having a nozzle hole, vacuum means for drawing air via said nozzle hole of said vacuum nozzle, and a vacuum passage communicating between said vacuum means and said nozzle hole of said vacuum nozzle, the nozzle clogging detection device for detecting clogging of said nozzle hole of said vacuum nozzle and erroneous mounting of said vacuum nozzle, and comprising:

a vacuum valve arranged across said vacuum passage for switching between said vacuum passage communicating with said vacuum means and a nozzle hole-opening passage for opening said nozzle hole to the atmosphere, flow rate measurement means arranged across said vacuum passage for measuring an actual flow rate of air drawn in through said nozzle hole; and nozzle clogging detection means for detecting clogging of said nozzle hole and erroneous mounting of said vacuum nozzle, by comparing said actual flow rate measured by said flow rate measurement means with a design flow rate of air to be drawn through said nozzle hole, said design flow rate of air being stored in advance.

2. A nozzle clogging detection device according to claim 1, wherein said flow rate measurement means comprises a flow meter that includes a planar member arranged along a direction of flow of air drawn in, said planar member having an upstream-side portion and a downstream-side portion, and measures said flow rate of air based on a difference between a temperature of said upstream-side portion of said planar member and a temperature of said downstream-side portion of said planar member.

3. A nozzle clogging detection device according to claim 1, wherein said nozzle clogging detection means includes calculation means for calculating a difference between said actual flow rate measured by said flow rate measurement means and said design flow rate, and judgment means for judging that there occurs said clogging of said nozzle hole or said erroneous mounting of said vacuum nozzle when the absolute value of said difference is larger than a predetermined value.

4. A nozzle clogging detection device according to claim 1, including notification means for carrying out notification of occurrence of said clogging of said nozzle hole or said erroneous mounting of said vacuum nozzle, when said nozzle clogging detection means detects said clogging of said nozzle hole or said erroneous mounting of said vacuum nozzle.

5. A nozzle clogging detection device according to claim 1, wherein said flow rate measurement means comprises a flow meter that includes a planar member arranged along a direction of flow of air drawn in, said planar member having an upstream-side portion and a down-stream side potion, and measures said flow rate of air based on a difference between a temperature of said upstream-side portion of said planar member and a temperature of said downstream-side portion of said planar member.

6. A nozzle clogging detection device for an electronic component-mounting apparatus according to claim 5 wherein said flow meter further comprises a passage space having a cylindrical shape; a flow sensor arranged in said passage space in such a manner as to extend in a direction transverse to said passage space.

* * * * *